Jan. 14, 1941.  A. E. PÉAN  2,228,729
METHOD OF MAKING HEALTH BREAD
Filed May 28, 1938

Inventor:
Andrew E. Péan
By Edward W. Weinert
Atty.

Patented Jan. 14, 1941

2,228,729

UNITED STATES PATENT OFFICE 2,228,729

METHOD OF MAKING HEALTH BREAD

Andrew E. Péan, Chicago, Ill.

Application May 28, 1938, Serial No. 210,659

8 Claims. (Cl. 99—90)

This invention relates to a health bread and method of making the same, that is adapted for use in hospitals, sanitariums and like places for the sustenance of patients, persons of ill health and the like, but that is also very beneficial to normal individuals for the preservation of health.

In the past, it has been the practice in making similar products, to simply mix the ingredients together and form a dough, and it was necessary to use a certain amount of potash pearlash and carbonate of ammonia for producing a chemical action for expanding the dough to make it light and fluffy. The amounts of chemical necessary to produce the proper expanding effect created a greenish interior color or hue in the product. At the same time, the product was more or less tough and acquired a musty taste after a short period of time.

It is an object of this invention to overcome the above noted objection in a health food in the provision of a product that always has a fine white appearing interior without any greenish color or hue; that is very light, porous and fluffy with a high nutritive value and vitamins.

It is a further object of this invention to provide a health bread that will always maintain a soft but semi-firm exterior, that is tasty and will keep for a long period without deteriorating or losing its tasty effect, and without becoming hard, brittle or crusty. This is accomplished to a great degree by my novel method.

I have discovered that if a sponge is made of certain ingredients according to the method to be disclosed herein and adding the dough to the sponge, it is possible to increase the natural expanding force of the ingredients without using the objectionable amounts of chemicals that were used in the past. At the same time, the product will be free of greenish color or hue and possesses a fine whitish interior and be tender and tasty. These results are partly due to the use of potassium corbonate instead of the potash pearlash heretofore used.

With these and other objects in view, which will become more apparent in the following description and disclosures, this invention comprises the novel product and method hereinafter set forth and more particularly pointed out and defined in the appended claims.

In the accompanying drawing which illustrates certain preferred forms of product involving this invention and in which similar reference numerals refer to similar features in the different views.

Figure 1:
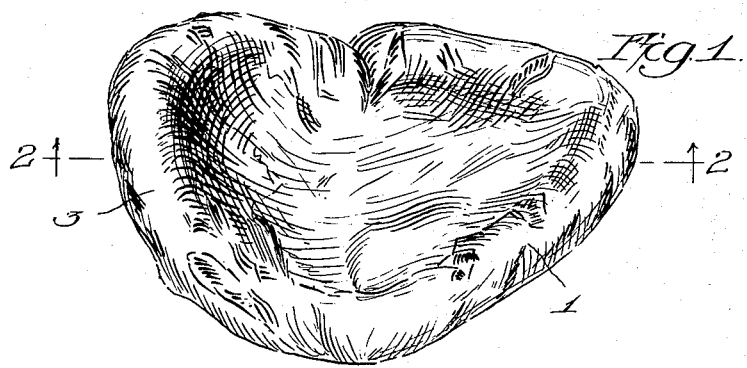
Fig. 1 is a perspective view of a loaf of health bread involving this invention.
Figure 2:
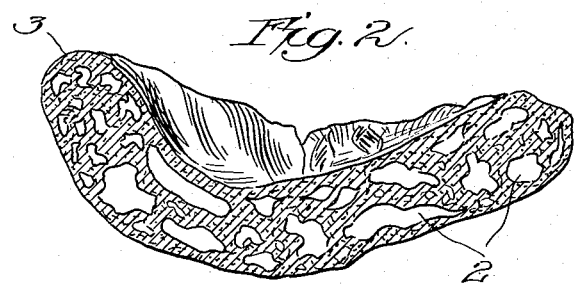
Fig. 2 is a sectional view taken upon the line II—II of Fig. 1.

The health bread involving this invention is made of wholesome ingredients which are treated according to a novel process involving three stages with a suitable rest interval between the different stages. The ingredients as well as the rest intervals may vary and for this reason the proportions of ingredients and rest intervals hereinafter noted should be understood as being merely the preferred ones. For making a commercial product for convalescents and normal persons, the proportions of ingredients used are preferably slightly different from the proportions used for making a special product for patients. The same process, however, is adapted for making both forms of health bread.

The health bread for convalescents and normal individuals is preferably made of wheat flour, eggs, water, butter, salt, potassium carbonate, and carbonate of ammonia. The proportions of these ingredients may be approximately as follows: wheat flour 42 per cent, eggs 40 per cent, water 10.7 per cent, butter 5 per cent, salt 1.65 per cent, potassium carbonate .35 per cent, and carbonate of ammonia .3 per cent.

In the event that it is desired to make a special health bread for patients or ill individuals, the proportion of ingredients may be varied. It is unnecessary to state the different variations that may be resorted to and only preferable proportions will be noted and may be as follows: wheat flour 35.5 per cent, egg yolks 45.75 per cent, egg whites 5 per cent, milk 8 per cent, salt 1.25 per cent, potassium carbonate 0.28 per cent, and carbonate of ammonia 0.22 per cent.

It will be noted that the chemical leavening agents of potassium salts and carbonate of ammonia have been materially reduced over the quantities heretofore used. For convalescents both are below .36% while for patients it is still lower. This decrease in the chemicals avoids the greenish hue and musty taste that such products have heretofore acquired. To compensate for the expanding force lost by the reduction of the chemical, I make a sponge as hereinafter set forth in which the greater percentage of eggs coming in contact with the heat create a large natural expanding force, so that the dough as hereinafter set forth that is added to the sponge does not require the usual amount of chemical agents heretofore used and a much smaller percentage for expanding purposes can be used.

Wheat flour used may consist of a mixture of two or more different brands of different qualities to insure a strong flour. This mixture of flour is first dried in a hot air chamber at about 120° F. in order to increase its absorbent qualities to the maximum.

First, I make what is known as the sponge from the following ingredients: dry sifted flour, butter, water and eggs. In making the sponge, according to one recipe, I take two pounds and thirteen ounces of flour and heat the same in a dry chamber at about 120° F. to increase its absorption qualities; two and a quarter pounds of butter; four pounds and fourteen and three-quarters ounces of eggs without the shells, approximately equal to forty-five eggs; and two and a quarter quarts of water. I first boil the water and butter in a suitable container and remove the same from the stove or fire and add the heated dry-sifted flour. I then return the container to the stove or fire and constantly stir the mixture until the butter oozes or percolates from the sponge so far formed. I then transfer the partly formed sponge to a high speed mixing apparatus in which the mass is rapidly agitated and I then add the eggs at suitable intervals.

Reducing the flour, butter and eggs to percentage, it will be noted that the sponge consists approximately of 28.1% flour; 22.5% butter and 49.3% eggs. Thus the percentage of eggs approximates the combined percentage of flour and butter and the eggs coming in contact with the heat will create a more powerful expanding force.

The dough to be added to the above-sponge consists of fifteen pounds and three ounces of flour; 12 pounds and 12¾ ounces of eggs; eleven and a quarter ounces of salt; two and a half ounces of potassium carbonate; and two ounces of carbonate of ammonia. These ingredients are poured into the mixer containing the sponge and the mixer is run at low speed until the mass becomes sticky and smooth.

The mass in the mixer, which is termed the dough, is removed after it becomes sticky and formed into suitable lumps which may be of any suitable weight, such as a pound for example. These lumps are then rolled and lengthened and wrapped in floured cloth and arranged in a pan or receptacle and allowed to relax or rest for about two hours or more in a cold dry chamber having a temperature of about 40° F.

After the lumps have rested for about two hours or more in the cool and dry chamber, each is divided into a plurality of preferably equal parts or small loaves which are preferably circular or round. The cut margins of the loaves are then slightly flattened and the parts or small loaves are then placed in floured pans and allowed to dry before the scalding process.

A container filled with water is placed upon a heater for bringing the water to the boiling point. When the boiling point is reached, the container is removed from the heater or the heater is shut off. As soon as the water ceases to boil, a number of the small loaves or parts which have sufficiently dried, are dropped into the hot water and the water is slowly stirred or agitated in such a manner as to prevent the small loaves from sticking together. When these small loaves are dropped into the hot water, they descend to the bottom, but when they have been sufficiently cooked, they rise to the surface. As soon as the small loaves rise to the surface, they are removed from the hot water and dropped into cold water for undergoing a cooling process. As soon as this cool water becomes warm through the absorption of heat from the small loaves, it is drawn off and replaced by fresh cold water. As a rule it takes about ten minutes for the first cold water to become warm and lose its cooling effect. This operation of replacing the water is repeated several times in order to wash all the flour from the small loaves and thoroughly cleanse the same. The water may be changed at about ten minute intervals during this cooling or cleansing process. When the small loaves have been sufficiently cooled and cleansed by this process, they are allowed to remain in cold water for a period of not less than four hours.

Thus it will be apparent that after the small loaves have undergone the scalding or cooking process they are subjected to a repeated cooling and cleansing process and when cooled they are maintained immersed in cold water for a material period such as four hours. During the cooking or scalding process, the surfaces or skin of the small loaves become somewhat hardened or tough. This cooling process, especially the latter long period, removes this hardness and softens the skin or surface. At the same time, the small loaves absorb a quantity of water and become moist.

It might be mentioned that all of the small loaves that could not be cooked or scalded with the first lot are subsequently scalded and cooled in a similar manner.

After the small loaves have been cooled and cleansed, as set forth, they are subjected to a draining process to remove the water therefrom and bring the same to a subsequently dry state.

The loaves are then placed in a closed pan or container and baked in an oven at a temperature of 425° to 450° F. for about twenty minutes. As the loaves are still somewhat moist when placed in the oven, a certain amount of steam will be generated in the container, with the result that they will be baked in a steamed compartment.

In making a special health bread for patients the same process is used as above set forth. In making the sponge for the commercial health bread the same ingredients are used as are used for making the health bread for normal use, except that two and a quarter quarts of milk are substituted for the water.

The dough for the special form of health bread also varies slightly from that used for health bread for normal use. The difference, however, is slight, and consists merely in the egg content. Instead of using whole eggs about 24 pounds of egg yolks are used, and in all other respects the ingredients are the same. The baking process for the special bread, however, may be carried out at a temperature of about 300° to 325° F. for about 50 minutes to an hour.

In Fig. 1 of the drawing, there is shown a loaf of health bread made for commercial consumption. It will be noted that it is extremely porous on account of the many spaces or recesses therein. It will further be noted that it is light in color with a white interior and is more or less fluffy.

Figure 3:
Fig. 3 is a perspective view of a slightly modified form of health bread.
Figure 4:
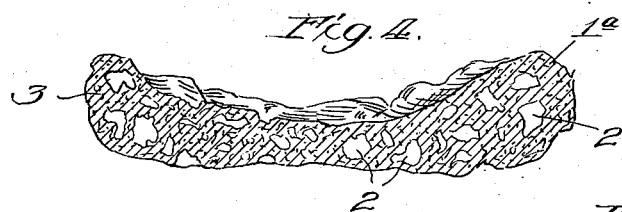
Fig. 4 is a sectional view taken upon the line IV—IV of Fig. 3.

Figs. 3 and 4 illustrate the health bread 1—a designed more particularly for patients. It is light, fluffy and porous with spaces or recesses 2 as in the commercial form, but slightly more brownish in color.

The health bread made in accordance with this invention has an expanded marginal portion 3 while the central portion is somewhat depressed. In other words, it presents a curling up effect around its margin.

It is characteristic of the health bread made according to this invention that it is extremely light with a high nutritive value and free of the starchy effect that is so common in many food products. In addition, it will retain its flavor and tastiness for a long period without deterioration, especially if it is confined in a dry chamber.

I am aware that changes may be made in the product and method without departing from the principles of this invention and I do not propose limiting the patent granted otherwise than necessitated by the prior art and appended claims.

I claim as my invention:

1. The herein described process of making a health bread which consists in boiling a bread making fluid with butter, adding dry heated flour thereto, agitating the mass until the butter percolates through the mass, then rapidly agitating the mass without the application of heat, adding eggs at intervals to the rapidly agitated mass, then adding flour, egg products, salt, potassium carbonate and carbonate of ammonia to the mass and slowly agitating the mass until it becomes sticky, then cutting the mass into suitable lumps, rolling and lengthening the lumps, then subjecting the same to a rest period of substantially three hours in a cool dry chamber, then cutting the lumps into loaves and drying said loaves, cooking the loaves, then immersing the cooked loaves in cold water for not less than four hours, then draining the water therefrom and baking the same in a closed container.

2. The herein described process of making a health bread which consists of forming a sponge by boiling butter in a bread making fluid, then agitating the same, adding heated dry-sifted flour and again agitating the mass until the butter oozes therefrom, then removing the mass from the heating zone and rapidly agitating the same, then adding at suitable intervals a quantity of eggs during the agitating period to create a more powerful natural expanding force, then adding a dough comprising flour, eggs, salt and chemical leavening agents in such proportions that each leavening agent shall constitute not over .36% of the combined sponge and dough, then adding the dough to the sponge and slowly working the combined mass until it becomes smooth and sticky, then cutting the mass into lumps, rolling and lengthening the lumps and subjecting the same to a rest period in a cool chamber, then cutting said lumps into loaves, cooking the same, then subjecting the loaves to relaxation in cool water for about four hours, then draining said loaves and baking the same in a closed container.

3. The herein described method of making a health bread which consists in forming a sponge from butter, flour and eggs, with a higher percentage of eggs than flour to create a natural expanding force, then making a dough by commingling flour, eggs and salt with leavening agents in such proportions that each leavening agent shall constitute not over .36% of the combined sponge and dough and then adding the dough to the sponge and slowly agitating the mass until it becomes smooth and sticky, then cutting the mass into lumps, working said lumps, and subjecting the same to a rest period, then forming the lumps into loaves, cooking the loaves, relaxing the same in cold water for a suitable period, then draining and baking the loaves in a closed container.

4. The herein described process of making a health bread which consists in boiling butter in a bread making fluid, adding dry and heated flour thereto, agitating the mass until the butter percolates through the mass, then rapidly agitating the mass, without the application of heat, adding eggs at suitable intervals until the proportional weight of eggs substantially approaches the combined weight of butter and flour, then forming a dough by commingling flour, eggs, salt and chemical leavening agents in such proportions that each leavening agent shall be less than .36% of the combined sponge and dough, then adding the dough to the sponge and slowly working the combined mass until it becomes sticky, then cutting the mass into lumps, working said lumps and subjecting the same to a rest period of about two hours in dry atmosphere at about 40° F., then cutting the lumps into loaves, scalding the loaves, then immersing the loaves in cool water for not less than four hours, then draining the water therefrom and baking the loaves in a closed container.

5. The herein described process of forming a health bread which consists in forming a sponge by boiling butter in a bread making fluid, adding heated dry sifted flour and rapidly agitating the mass until the butter oozes from the mass, then removing the mass from the heating zone and rapidly agitating the mass, adding eggs thereto at suitable intervals during the agitation, then forming a dough by commingling flour, eggs, salt and chemical leavening agents in such proportions that each leavening agent shall be less than .36% of the combined sponge and dough, then adding the dough to the sponge and slowly working the combined sponge and dough until it becomes smooth and sticky, then cutting the mass into lumps and subjecting the same to a suitable rest period, then severing said lumps into loaves, scalding said loaves, subjecting the same to a substantial rest period in cold water, then removing and draining said loaves and baking the same in a closed container.

6. The herein described steps of making a health bread which consists in forming a sponge by boiling butter in a bread making fluid, adding dry-sifted and heated flour thereto and rapidly agitating the mass until the butter oozes from the mass, then removing the sponge from the heating zone and rapidly agitating the same, then adding eggs at suitable intervals during the agitating period, then forming a dough by commingling flour, eggs, salt and chemical leavening agents in such proportions that each leavening agent shall constitute less than .36% of the combined sponge and dough, then adding the dough to the sponge and slowly working the combined dough and sponge until the same becomes smooth and sticky.

7. The herein described process of making a health bread which consists in boiling a bread making fluid with butter, adding dry heated flour thereto, agitating the mass until the butter percolates through the mass, then rapidly agitating the mass without the application of heat, adding eggs at intervals to the rapidly agitated mass, then adding flour, egg products, salt, potassium leavening agent and carbonate of ammonia to the mass and agitating the mass until it becomes sticky, then cutting the mass into suitable lumps, rolling and lengthening the lumps, then subjecting the same to a rest period of substantially three hours in a cool dry chamber, then cutting the lumps into loaves and drying said loaves, cooking the loaves, then immersing the cooked loaves in cold water for a substantial period, then draining the water therefrom and baking the same in a closed container.

8. The herein described process of making a health bread which consists in forming a sponge by boiling a bread making fluid with butter and adding dry heated flour thereto, then agitating the mass until the butter percolates through the mass, then rapidly agitating the mass without the application of heat, and adding eggs at intervals to the rapidly agitated mass, then forming a dough by combining flour, egg products, salt and chemical leavening agents, adding the dough to the sponge and agitating the combined sponge and dough until the mass becomes sticky, then cutting the mass into lumps, working said lumps, then subjecting the lumps to a substantial rest period in a cool dry chamber, then cutting the lumps into loaves and drying said loaves, then cooking the loaves, thereafter immersing the cooked loaves in cold water for a substantial period, then draining the water therefrom and baking the loaves in a closed container.

ANDREW E. PÉAN.